(12) United States Patent
Tucker

(10) Patent No.: US 6,679,338 B1
(45) Date of Patent: Jan. 20, 2004

(54) LOCATING SYSTEM AND METHOD

(75) Inventor: Robert Manning Tucker, Bunbury (AU)

(73) Assignee: Agriculture Guide Implement Systems Pty Ltd. (AU)

( * ) Notice: Subject to any disclaimer, the term of this patent is extended or adjusted under 35 U.S.C. 154(b) by 111 days.

(21) Appl. No.: 10/031,550

(22) PCT Filed: Jul. 19, 2000

(86) PCT No.: PCT/AU00/00862

§ 371 (c)(1),
(2), (4) Date: Jan. 18, 2002

(87) PCT Pub. No.: WO01/05213

PCT Pub. Date: Jan. 25, 2001

(30) Foreign Application Priority Data

Jul. 20, 1999 (AU) .............................................. PQ 1741
May 8, 2000 (AU) .............................................. PQ 7326

(51) Int. Cl.$^7$ .............................................. A01B 63/00
(52) U.S. Cl. .............................. 172/6; 172/5; 343/742; 180/401
(58) Field of Search ................................ 343/741, 742, 343/867, 866; 172/2, 5, 6, 26, 190, 191; 180/401, 906; 111/200, 903

(56) References Cited

U.S. PATENT DOCUMENTS

| | | |
|---|---|---|
| 2,842,039 A | 7/1958 | Swingle |
| 3,468,379 A | 9/1969 | Rushing et al. |
| 4,180,133 A | 12/1979 | Collogan et al. |
| 4,228,860 A | 10/1980 | Orthmann |
| 4,463,811 A | 8/1984 | Winter |
| 4,526,235 A | 7/1985 | Kinzenbaw |
| 4,700,301 A | 10/1987 | Dyke |
| 4,930,581 A | 6/1990 | Fleischer et al. |
| 4,967,362 A | 10/1990 | Schutten et al. |
| 5,019,983 A | 5/1991 | Schutten et al. |
| 5,029,650 A | * 7/1991 | Smit .............................. 172/5 |
| 5,031,704 A | * 7/1991 | Fleischer et al. .............. 172/6 |
| 5,072,800 A | 12/1991 | Price |
| 5,094,300 A | 3/1992 | Jurgena |
| 5,181,572 A | 1/1993 | Andersen et al. |
| 5,240,079 A | 8/1993 | Schmidt |
| 5,255,756 A | 10/1993 | Follmer et al. |
| 5,307,611 A | 5/1994 | Vardeman et al. |
| 5,429,061 A | 7/1995 | Bourgeois |
| 5,579,716 A | 12/1996 | Groff |
| 5,636,792 A | 6/1997 | Sauter et al. |
| 5,666,893 A | 9/1997 | Bourgeois |

FOREIGN PATENT DOCUMENTS

| | | |
|---|---|---|
| AU | 668068 | 4/1996 |
| DE | 3831764 | 3/1990 |
| DE | 2900553 | 8/1997 |
| EP | 97515 | 1/1984 |
| EP | 801885 | 10/1997 |
| RU | 562232 | 8/1977 |
| RU | 2033010 | 4/1995 |
| RU | 2050761 | 12/1995 |
| SE | 9000308 | 1/1990 |
| SU | 650538 | 11/1977 |

* cited by examiner

*Primary Examiner*—Tho Phan
(74) *Attorney, Agent, or Firm*—Bachman & LaPointe

(57) ABSTRACT

A locating system and method for determining the location of an article relative to a crop row. The system comprises a plurality of marker means substantially linearly disposed at intervals substantially parallel to the crop row. A sensor means is provided to generate a sensor signal indicative of the location of the sensor means and hence the article in relation to the crop row.

22 Claims, 5 Drawing Sheets

LOCATING SYSTEM AND METHOD

BRIEF DESCRIPTION OF THE INVENTION

The present invention relates to a locating system and method and, in particular, to a locating system and method for determining the location of an article relative to a crop row.

FIELD OF THE INVENTION

It is common in the agricultural industry to plant food crops in rows, each row being spaced from an adjacent row by a predetermined distance and the rows being generally parallel to each other. The areas between the crop rows facilitate access to the crops for the purpose of tending the crops.

In order to reduce the presence of weeds both in such areas between the rows and amongst the crops, it has been common to spray the crops with herbicides. However, such use of herbicides on food crops is becoming of greater concern to the public as excessive use of herbicides and fertiliser cause contamination of produce and excessive levels of nutrients in waterways. The use of herbicides for this purpose also introduces additional expense into the growth of the crops.

A solution to the above mentioned problem is to employ a manually controlled mechanical weeding apparatus to remove weeds between the crop rows. However, in order to remove the weeds with such mechanical weeding apparatus, it is necessary to accurately steer the mechanical weeding apparatus between the crop rows so as to avoid damaging the crop. This is often extremely difficult as the crop rows are generally not perfectly straight. Manual movement of the weeding apparatus is also very slow.

An alternative method of guiding a mechanical weeding apparatus incorporates a vision based system using CCD imaging and computer analysis to determine the location of the apparatus relative to the crop rows. However, although such a system operates satisfactorily in determining the location of the crop rows, the system is complex and expensive, and the accuracy of the system is dependent on weed density, the shape of the crop and wind and lighting conditions.

The present invention seeks, among other things, to provide a system which overcomes the above mentioned disadvantages.

SUMMARY OF THE INVENTION

In accordance with one aspect of the present invention, there is provided a locating system for determining the location of an article relative to a crop row, the system characterised by including a set of markers capable of being buried, the set of markers being substantially linearly disposed at spaced intervals substantially parallel to and along the length of the crop row, the set of markers having a predetermined characteristic selectable from a range of possible characteristics such that the predetermined characteristic is specific to the set and a sensor unit mounted relative to the article, in use, substantially above the markers, the sensor unit being arranged to detect a signal corresponding to the predetermined characteristic of the set of markers and to generate a sensor signal indicative of the location of the sensor unit relative to the set of markers and thereby of the article relative to the crop row.

In accordance with a further aspect of the present invention, there is provided a method of determining the location of an article relative to a crop row, the method including the steps of selecting a set of markers having a specific predetermined characteristic from a range of possible characteristics, the markers being capable of being buried, disposing the set of markers substantially linearly at spaced intervals substantially parallel to and along the length of the crop row, and providing a sensor unit mounted relative to the article, substantially above the set of markers, the sensor unit detecting a signal corresponding to the predetermined characteristic of the set of markers and generating sensor signal indicative of the location of the sensor unit relative to the set of markers and thereby of the article relative to the crop row.

The article may be a mechanical weeding apparatus and the weeding apparatus may include a movement actuator adapted to adjust the lateral position of the weeding apparatus relative to the crop rows in response to the control signal from the control means. In this way, the location of the weeding apparatus may be adjusted so that the weeding apparatus is maintained in the desired location relative to the crop row whereby weeds are removed without damaging the crop.

Alternatively, the article may be a herbicide spraying apparatus or fertiliser disposing apparatus which includes a movement actuator adapted to adjust the lateral position of the spraying apparatus or disposing apparatus relative to the crop rows in response to the control signal from the control means. In this way, the location of the spraying apparatus or disposing apparatus relative to the crop may be maintained, and herbicide may be sprayed only on weeds in areas between adjacent crop rows or fertiliser may be disposed only on crops.

DESCRIPTION OF THE DRAWINGS

The present invention will now be described, by way of example, with reference to the accompanying drawings, in which:

FIG. 6b is a diagrammatic plan view of a portion of the marker disposal unit shown in FIG. 6a.

DESCRIPTION OF THE INVENTION

Figure 1:
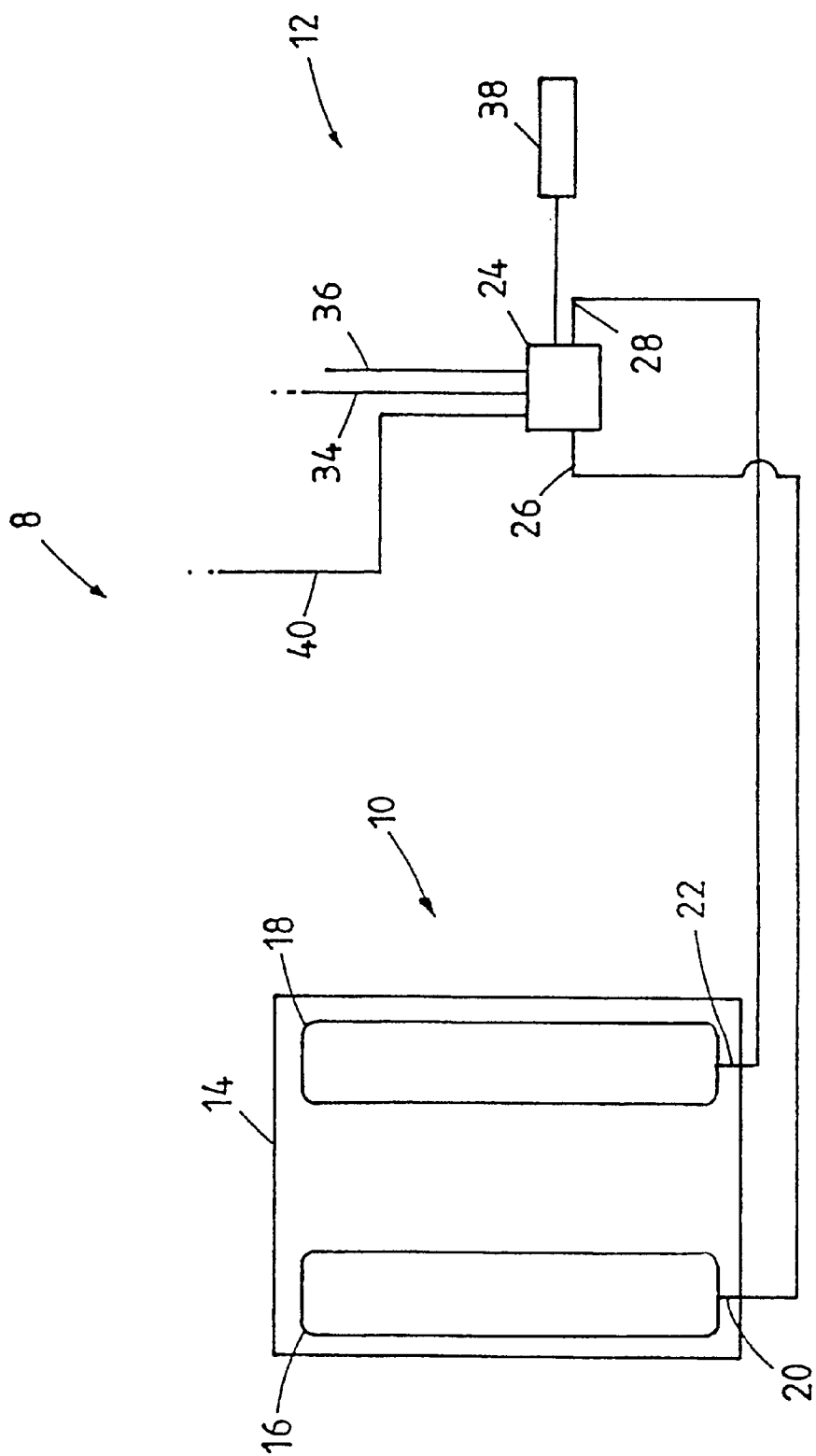
FIG. 1 is a diagrammatic representation of a first embodiment of a sensing unit and a control unit of a locating system in accordance with the present invention.
Figure 2C:
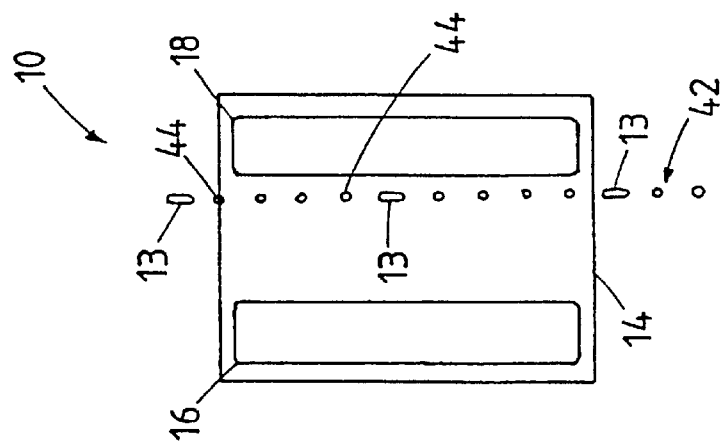
FIGS. 2a, 2b and 2c are diagrammatic representations of the sensing unit shown in FIG. 1 located, in use, in different locations relative to a crop row.
Figure 2B:
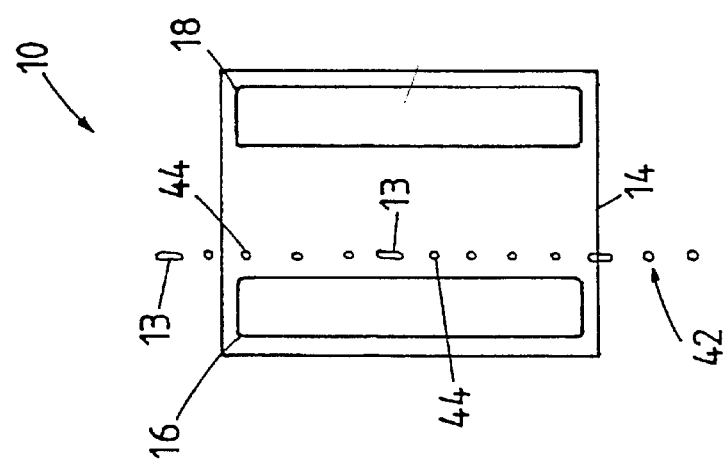
Figure 2A:
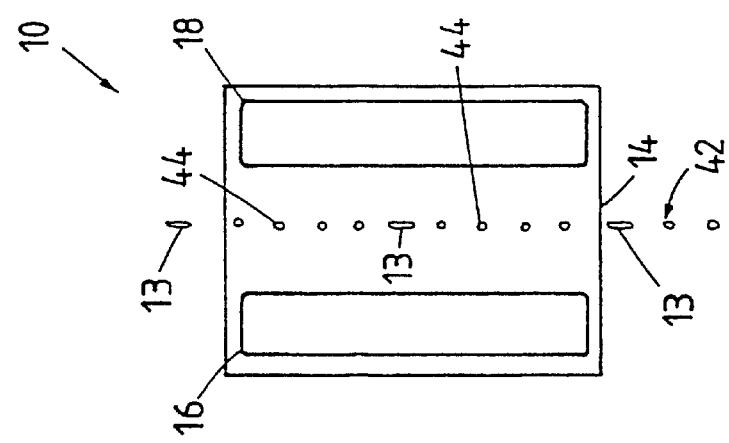

Referring to FIGS. 1 and 2, there is shown a first embodiment of a locating system 8 including a sensing unit 10 and a control unit 12. The locating system 8 also includes marker means in the form of markers 13, shown in use in FIGS. 2a, 2b and 2c.

The sensing unit 10 includes a signal generation means, in this example a source of magnetic radiation in the form of a transmitting coil 14, and sensor means responsive to the transmitting coil 14, in this example in the form of first and second receiving coils 16 and 18 respectively. The first receiving coil 16 includes a first coil output 20 and the second receiving coil 18 includes a second coil output 22. The first and second receiving coils 16, 18 are of substantially the same configuration and are spaced substantially the same distance from the centre of the transmitting coil 14. The arrangement of the sensing unit 10 is such that the transmitting coil 14 emits magnetic radiation which is receivable by the first and second receiving coils 16, 18, the first and second receiving coils each generating a current through the first and second receiving coils 16, 18 and a voltage across the first and second receiving coils 16, 18 in response to the received magnetic radiation. Under normal circumstances, since the configuration of the first and second receiving coils 16, 18 is substantially the same and the first and second receiving coils 16, 18 are spaced substantially the same relative to the transmitting coil 14, the magnitude of the current and voltage generated by the first receiving coil 16 in response to the received magnetic radiation is substantially the same as the magnitude of the current and voltage generated by the second receiving coil 18 in response to the received magnetic radiation. Preferably, the first and second receiving coils 16 and 18 are arranged to be nulled under normal conditions such that no signal is generated on either of the first or second coil outputs 20 and 22 as a result of the radiation generated by the transmitting coil 14.

The control unit 12 includes a logic circuit 24 having first and second logic circuit inputs 26 and 28 respectively. The logic circuit 24 also includes first and second logic circuit outputs 34 and 36 respectively and a power supply (not shown) for supplying the required power to all components of the locating system.

The logic circuit 24 is arranged so that, in use, the logic circuit 24 receives a signal on the first logic circuit input 26 from the first coil output 20 and a signal on the second logic circuit input 28 from the second coil output 22. The signals received on the first and second logic circuit inputs 26 and 28 are indicative of the magnitudes of currents generated in the first and second receiving coils 16 and 18 respectively. The logic circuit 24 then compares the respective magnitudes of the signals received on the first and second logic circuit inputs 26 and 28 and generates output signals indicative of the difference between the two signals on the first and second logic circuit outputs 34, 36.

The control unit 12 also includes a tolerance circuit 38 which allows a user to set the level of accuracy of the locating system, and a driver interface connection 40 which connects the logic circuit 24 to a control panel (not shown) for use by a user.

The sensing unit 10 of FIG. 1 is shown in use above a crop row 42 in FIGS. 2a, 2b and 2c. Markers 13 are interspersed with crops 44 in the crop row 42 such that the markers 13 are disposed substantially linearly and parallel to the crop row 42. The markers 13 are arranged to generate a signal or to distort the field produced by the transmitting coil 14 such that the result is detectable by the first and second receiving coils 16 and 18. For example, the markers 13 may comprise a metallic object. The magnetic field generated by the transmitting coil 14 will induce current flow in the metallic object, which will in turn generate a magnetic field detectable by the first and second receiving coils 16 and 18. Each of the first and second receiving coils 16 and 18 along with the transmitting coil 14 therefore acts in a manner similar to known metal detectors.

The metallic markers are preferably arranged to degrade over time to reduce the incidence of metallic markers from previous crops being detected within a current crop.

Preferably, the markers 13 are in the form of tuned markers. The tuned markers are arranged to generate a magnetic field when exposed to a magnetic field from the transmitting coil 14 of a predetermined frequency. The tuned markers may be constructed by known methods. For example, a resonant circuit tuned to a desired frequency could be incorporated within the marker 13. Alternatively, the marker 13 may be of a cavity resonator type, wherein the physical characteristics of a cavity within the marker 13 determined the frequency to which it will respond. Further, the markers 13 may be transponders capable of transmitting additional information. The transponder may include sensors capable of measuring soil conditions and could transmit this information when activated to a data storage means included in the locating system 8. This information could then be used to evaluate land conditions for crop planning.

The tuned markers would have the advantage that the interference from other metal objects, such as parts of the machinery on which the locating system 8 is mounted, would be reduced. Further, tuned markers of different frequencies could be used in subsequent crops to ensure that markers left in the soil from previous crops are not detected. A number of frequencies could be used alternatively to ensure that the tuned markers have degraded by the time the tuned markers of a certain frequency are used again.

In a further embodiment, the markers may be remotely deactivated so that they will not be detectable by the sensing unit 10. Transponders of such type are known. This would allow the markers to become inactive at a time specified by the user in relation to the time requirements of the current crop.

In FIG. 2b, the markers 13 are located closer to the first receiving coil 16 than the second receiving coil 18 and, therefore, the magnitude of the current generated in the first receiving coil 16 is greater than the magnitude of the current generated in the second receiving coil 18.

In FIG. 2c, the markers 13 are located closer to the second receiving coil 18 than the first receiving coil 16 and, therefore, the magnitude of the current generated in the second receiving coil 18 is greater than the magnitude of the current generated in the first receiving coil 16.

It will also be understood that the difference in the magnitude of the currents generated in the first and second receiving coils 16, 18, which is determined by the logic circuit 24, is indicative of the lateral position of the transmitting coil 14 relative to the markers 13 and thereby to the crop row 42.

It will also be appreciated that the configuration of the transmitting coil 14 and the sensing coils 16, 18 may be adjusted to suit the type of crop or the distance between markers 13, for example by increasing or decreasing the length of the transmitting coil 14 and the sensing coils 16, 18.

The tolerance circuit 38 operates so as to allow a user to set a maximum permitted distance of deviation of the transmitter coil 14 from a central location relative to the markers 13. In this way, a signal indicative of a required movement of the sensing unit 10 does not appear on the first and second logic circuit outputs 34, 36 until the difference in signals corresponds to the maximum permitted distance.

Figure 3:
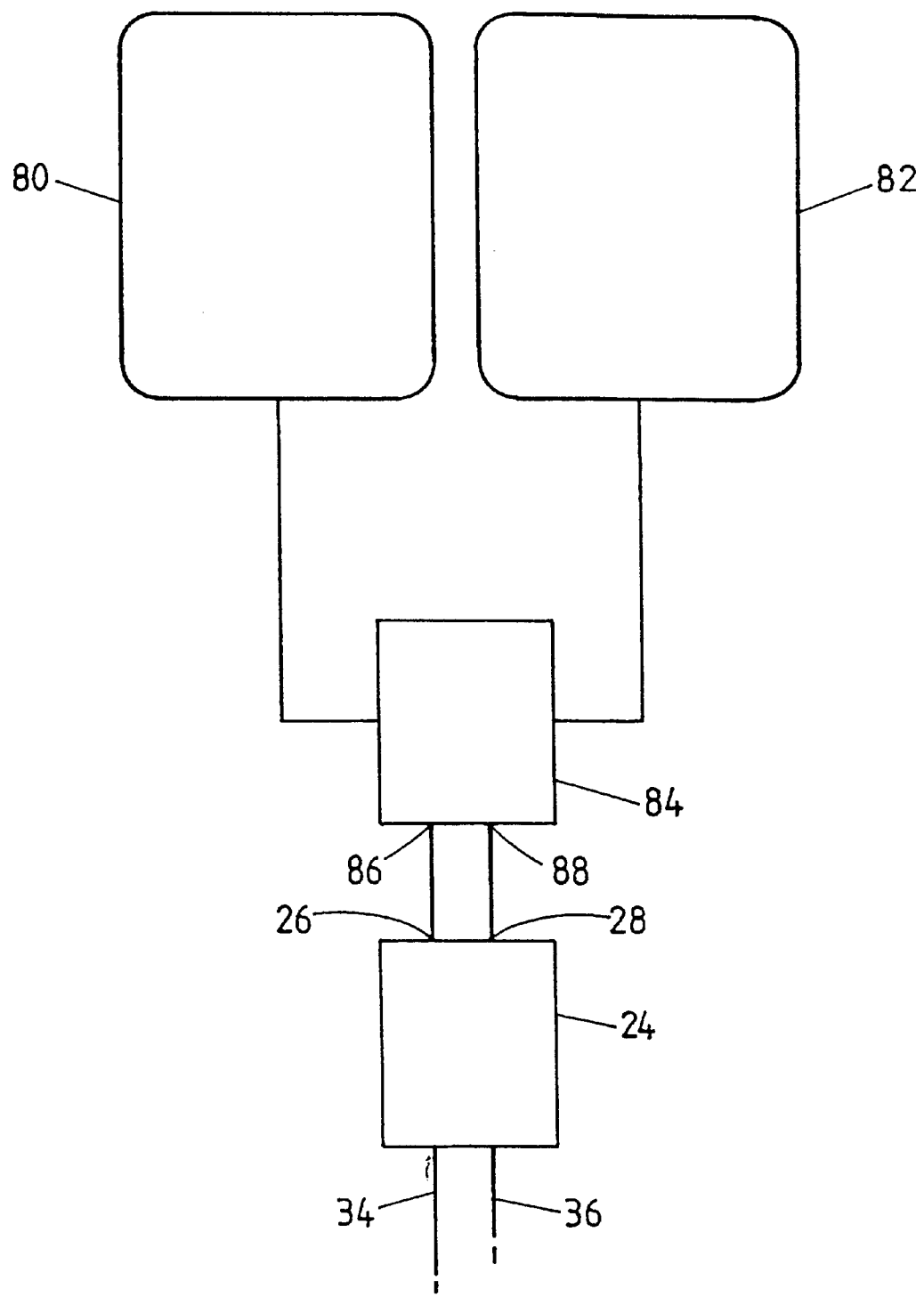
FIG. 3 is a diagrammatic representation of a second embodiment of a sensing unit and a control unit of a locating system in accordance with the present invention.

FIG. 3 shows an alternative embodiment of a locating system 8 in accordance with the present invention. The locating system 8 of FIG. 3 includes a first antenna 80, a second antenna 82 and an antenna controller circuit 84.

The markers 13 in this embodiment are in the form of tuned transponders, arranged to transmit a response signal on receiving a signal from either of the first or second antennas 80 and 82.

The antenna controller circuit 84 is capable of providing a driving signal to each of the first and second antennas 80 and 82 and also of detecting response signals received by the first and second antennas 80 and 82.

In use, the antenna controller circuit 84 first provides a driving signal to the first antenna 80 while the second antenna remains idle. The first antenna 80 is arranged such that if a marker 13 is positioned directly below the area of the first antenna 80, the transmitted signal from the first antenna 80 will activate the marker 13 to emit a response signal. The response signal from the marker 13 may then be received by the first antenna 80 and detected by the antenna controller circuit 84. The antenna controller circuit 84 then deactivates the first antenna 80 and provides a driving signal to the second antenna 82. If a marker 13 is positioned directly below the area of the second antenna 82, then the marker 13 is activated to generate a response signal. The response signal may be received by the second antenna 84 and detected by the antenna controller circuit 84. The antenna controller circuit then continues to drive the first and second antennas 80 and 82 alternately. The frequency at which the first and second antennas 80 and 82 are alternately driven is set so that sufficient information can be obtained regarding the position of the markers 13 for the speed of travel of the article on which the locating system 8 is mounted.

The antenna controller circuit 84 further includes first and second signal outputs 86 and 88. The first and second signal outputs 86 and 88 provide signals to the logic circuit 24 on first and second logic circuit inputs 26 and 28. The signals generated on first and second signal outputs 86 and 88 are indicative of whether a response signal from a marker 13 is received by either the first or second antenna 80 or 82 respectively. The logic circuit 24 includes logic circuit outputs 34 and 36 on which are generated signals indicative of the required movement of the sensing means 10 relative to the crop row 42.

In a further embodiment of the locating system 8 of FIG. 3, the first and second antennas 80 and 82 are arranged such that they are positioned the same distance from the row of markers but with the first antenna 80 being positioned forward of the second antenna 82. The would result in a lower level of interference between the first and second antennas 80 and 82 so that both may be turned on at the same time.

Figure 4:
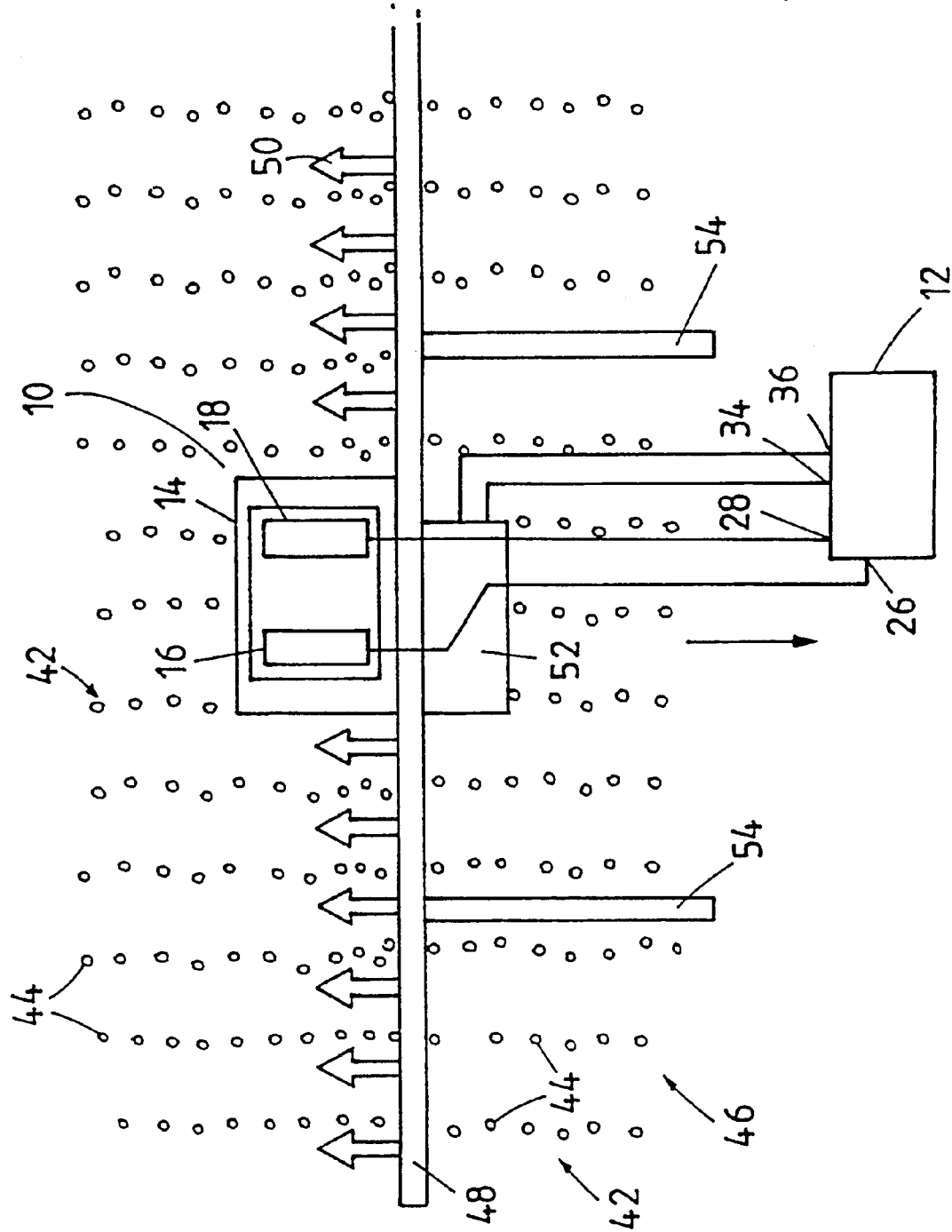
FIG. 4 is a diagrammatic representation of a mechanical weeding apparatus including the sensing unit and the control unit of FIG. 3.

The locating system 8 of FIGS. 1 and 2 is shown mounted on a mechanical weeding apparatus 46 in FIG. 4.

The weeding apparatus 46 includes a tool bar 48 and a plurality of harrows 50 adapted to remove weeds from the ground when the weeding device 46 is moved in the direction of the arrow.

Mounted on the tool bar 48 is a movement actuator 52 which is adapted to move the tool bar 48 and thereby the harrows 50 in left and right lateral directions parallel to the tool bar 48 in response to an appropriate signal from the processing unit 8. The weeding apparatus 46 also includes tool bar arms 54 for attachment to a suitable pulling vehicle, for example a tractor (not shown).

The movement actuator 52 is connected to the first and second logic circuit outputs 34, 36 of the control unit 12, the movement actuator 52 thereby receiving the output signals from the control unit 12 and, in response to the output signals, returning the sensing unit 10 to a central location relative to the markers 13, and thereby moving the tool bar 48 and the harrows 50 in a left lateral or right lateral direction parallel to the tool bar 48. The type of control signal output generated by the control unit 12 and the corresponding left lateral or right lateral movement of the tool bar 48 depends on whether the transmitting coil 14 is disposed to the left, to the right or centrally relative to the crop row 42 under inspection.

In this way, the harrows 50 are maintained between the crop rows 42 thereby ensuring that weeds are removed from between the crop rows 42 without damaging the crops 44.

Figure 5:
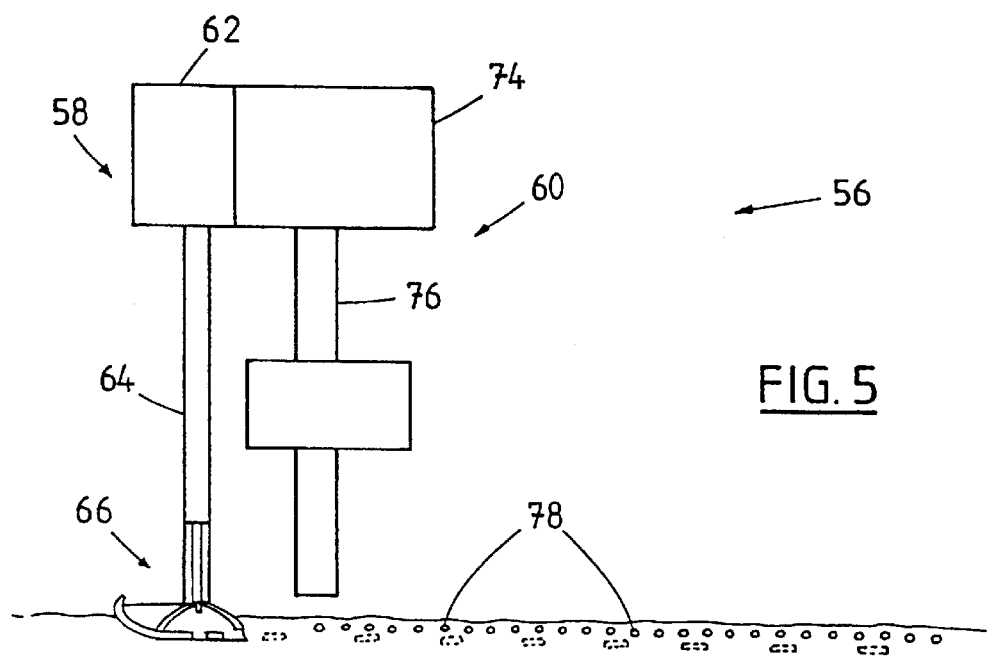
FIG. 5 is a diagrammatic side view of a marker and seed disposal unit of the locating system of the present invention.

In FIG. 5, there is shown a marker and seed disposal unit 56 of the locating system 8, the marker and seed disposal unit 56 including a marker disposal unit 58 and a seed disposal unit 60.

The marker disposal unit 58 includes a marker receptacle 62, a marker tube 64 and a foot portion 66.

The foot portion 66 is shown in more detail in FIGS. 5a and 5b, the foot portion 66 including a foot member 70 adapted to create a groove in the ground as the foot member 70 is drawn through the ground in the direction of the arrows in FIGS. 5a and 5b, and backfill arms 72 adapted to urge soil adjacent the groove to fill the groove as the foot member 70 is drawn through the ground.

Figure 6A:
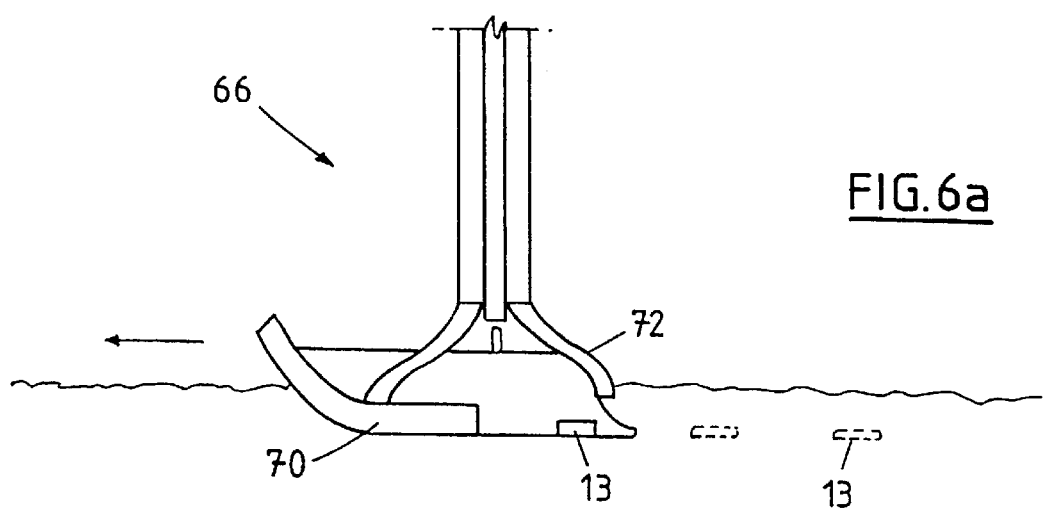
FIG. 6a is a diagrammatic side view of a lower portion of a marker disposal unit of the marker and seed disposal unit shown in FIG. 5.
Figure 6B:
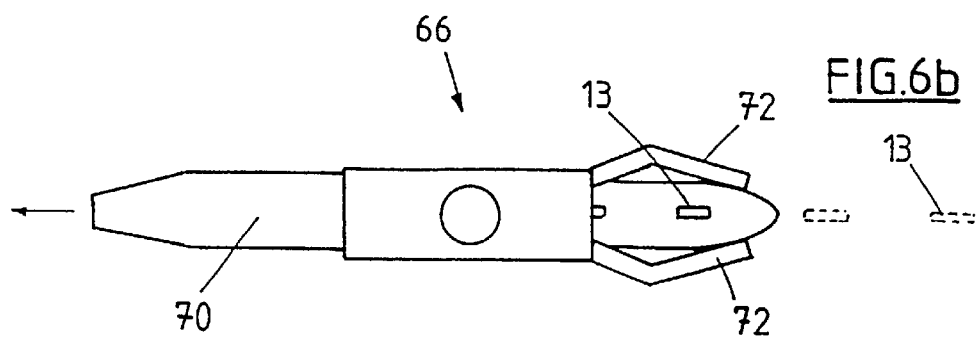

The arrangement is such that as the foot portion 66 is drawn through the ground the foot member 70 creates a groove, markers 13 are periodically dispensed into the groove from the marker receptacle 62 by passing through the marker tube 64, and the groove is filled in by the backfill arms 72. In FIGS. 6a and 6b, the markers 13 which have been dispensed and covered with soil are shown in broken lines and the markers 13 which are not covered with soil are shown in full lines.

The seed disposal unit 60 includes a seed receptacle 74 and a seed tube 76, the arrangement being such that as the foot portion 66 is drawn through the ground in the direction of the arrows in FIGS. 6a and 6b, seeds 78 are periodically dispensed.

It will be understood that the marker and seed disposal unit 56 operates, in use, to substantially linearly dispense seeds 78 and markers 13, with the markers 13 interspersed with the seeds 78 in a line substantially parallel to the seeds 78.

It will be appreciated that various forms of movement actuator 52 are envisaged. The movement actuator may be hydraulically or electrically operated. For example, the movement actuator may include an electric driven worm drive which acts against a fixed surface. Alternatively, the movement actuator may include an actuating arm mounted between the weeding apparatus and a disk in contact with the ground, the disk providing a fixed lateral location relative to which the apparatus can be laterally moved.

Also, the movement actuator 52 of a locating system 8 may be interconnected to a steering mechanism of a vehicle such as a tractor, where a device such as the weeding apparatus 46, described above, is towed by the vehicle. The steering of the vehicle would then be controlled by the locating system 8 such that the position of the vehicle is also controlled in relation to the position of the crop rows.

Furthermore, it will be appreciated that although the above embodiment has been described in relation to a mechanical weeding apparatus, the present invention is also applicable to other applications such as herbicide spraying apparatus where it is desired to spray only between adjacent crop rows or to placement apparatus where it is desired to accurately place substances, for example, fertiliser, adjacent the crop rows.

It will also be appreciated that although the above embodiment has been described in relation to markers and sensing means utilising magnetic and electromagnetic fields. Other marking and sensing arrangements are equally applicable to the locating system of the present invention. For example, a marker of a specific shape could be used, the sensing means utilising radar to locate the position of the marker by recognising the specific shape.

Modifications and variations as would be apparent to a skilled addressee are deemed to be within the scope of the present invention.

What is claimed is:

1. A locating system for determining the location of an article relative to a crop row, the system characterised by including a set of markers capable of being buried, the set of markers being substantially linearly disposed at spaced intervals substantially parallel to and along the length of the crop row, the set of markers having a predetermined characteristic selectable from a range of possible characteristics such that the predetermined characteristic is specific to the set and a sensor unit mounted relative to the article, in use, substantially above the markers, the sensor unit being arranged to detect a signal corresponding to the predetermined characteristic of the set of markers and to generate a sensor signal indicative of the location of the sensor unit relative to the set of markers and thereby of the article relative to the crop row.

2. A locating system in accordance with claim 1, characterised in that the locating system includes a control unit capable of receiving the sensor signal from the sensor unit, and a movement actuator capable of adjusting the lateral position of the article in response to signals received from the control unit.

3. A locating system in accordance with claim 1, wherein the sensor unit includes a signal generation means capable of generating a predetermined transmit signal and sensor means capable of detecting a return signal indicative of the location of the sensor unit relative to the set of markers, the set of markers being tuned to the predetermined transmit signal such that the return signal is only produced when the set of markers are exposed to the predetermined transmit signal.

4. A locating system in accordance with claim 3, wherein the transmit signal is of a predetermined frequency and the set of markers are tuned to the frequency such that the set of markers generate the return signal when the markers are exposed to the predetermined transmit signal.

5. A locating system in accordance with claim 4, characterised in that each of the markers include a resonance circuit tuned to the predetermined frequency.

6. A locating system in accordance with claim 4, characterised in that the signal generator means is a transmitting coil and the first and second sensor means are first and second receiving coils, wherein a current is passed through the transmitting coil to produce a magnetic field and magnetic radiation received by the first and second receiving coils induces current in the receiving coils detectable on the respective first and second outputs.

7. A locating system in accordance with claim 3, wherein the markers may be remotely deactivated such that the return signal is no longer produced in response to the predetermined signal.

8. A locating system in accordance with claim 3, characterised in that the signal generation means is a transmitting coil and the sensor means comprises first and second receiving coils, wherein a current is passed through the transmitting coil to produce a magnetic field and magnetic radiation received by the first and second receiving coils induces current in the receiving coils detectable on respective first and second signal outputs.

9. A locating system in accordance with claim 8 characterised in that the control unit includes a logic circuit having first and second signal inputs connected to the first and second signal outputs respectively, the logic circuit further including at least one logic circuit output providing a signal indicative of the difference between signals on the first and second signal inputs.

10. A locating system in accordance with claim 8, characterised in that the first and second receiving coils are arranged symmetrically with respect to the magnetic field produced by the transmitting coil.

11. A locating system in accordance with claim 8, characterised in that the driving signal is of a pre-determined frequency and the marker is tuned to respond only to the pre-determined frequency.

12. A locating system in accordance with claim 3, characterised in that the sensor means comprises first and second antennas and the first and second antennas act also as the signal generation means, the antennas being provided with a driving signal to generate an electromagnetic field when acting as the signal generation means and the driving signal being switched off so that the first and second antennas may detect the pre-set return signal from the markers induced by the transmitted electromagnetic field.

13. A locating system in accordance with claim 12, characterised in that the driving signal is alternately provided to the first antenna and the second antenna.

14. A locating system in accordance with claim 1, characterised in that the marker means is arranged to physically degrade over time.

15. A locating system in accordance with claim 1, wherein the markers are arranged to physically degrade overtime.

16. A locating system in accordance with claim 1, characterised in that the markers include soil sensing means capable of measuring characteristics of the soil and the markers being capable of transmitting information from the soil sensing means to the sensing unit.

17. A locating system in accordance with claim 1, characterised in that the article is a mechanical weeding apparatus.

18. A locating system in accordance with claim 1, characterised in that the article is a crop spraying apparatus.

19. A locating system in accordance with claim 1, characterised in that the article is a crop spraying apparatus.

20. A method of determining the location of an article relative to a crop row in accordance with claim 19, wherein a control unit and a movement actuator are provided, the control unit receiving the sensor signal from the sensor unit and the movement actuator adjusting the lateral position of the article in response to signals from the control unit.

21. A method of determining the location of an article relative to a crop row in accordance with claim 20, characterised in that the sensor unit comprises a signal generation means and at least one sensor means, the signal generator means transmitting a signal of a pre-determined frequency and the marker means being adapted to transmit a return signal on receiving the transmitted signal but the marker means not transmitting a return signal in response to signals of other frequencies.

22. A method of determining the location of an article relative to a crop row in accordance with claim 19, wherein the sensor unit is provided with a signal generation means and a sensor means, the signal generating means generating a predetermined transmit signal and the sensor means detecting a return signal indicative of the location of the sensor unit relative to the set of markers, the set of markers being tuned to the predetermined transmit signal such that the return signal is only produced when the set of markers are exposed to the predetermined transmit signal.

* * * * *